(12) United States Patent
Chen et al.

(10) Patent No.: US 7,634,952 B2
(45) Date of Patent: Dec. 22, 2009

(54) ROTATING NUT BALL SCREW UNIT WITH LUBRICATING ARRANGEMENT

(75) Inventors: Xin-He Chen, Taichung (TW); Chieh-Hung Tsai, Taichung (TW); Wu-Teng Hsieh, Taichung (TW)

(73) Assignee: HIWIN Technologies Corp., Taichung (TW)

( * ) Notice: Subject to any disclaimer, the term of this patent is extended or adjusted under 35 U.S.C. 154(b) by 135 days.

(21) Appl. No.: 11/944,659

(22) Filed: Nov. 26, 2007

(65) Prior Publication Data
US 2009/0133520 A1    May 28, 2009

(51) Int. Cl.
*F16H 25/22* (2006.01)
(52) U.S. Cl. .................................. 74/89.44; 74/89.43
(58) Field of Classification Search ................. 74/89.44, 74/89.43, 89.41, 424.81, 89.4
See application file for complete search history.

(56) References Cited

U.S. PATENT DOCUMENTS

| | | | | |
|---|---|---|---|---|
| 888,619 | A * | 5/1908 | Kelly | 74/89.44 |
| 5,809,838 | A * | 9/1998 | Miyaguchi et al. | 74/89.44 |
| 6,364,058 | B1 * | 4/2002 | Nishide et al. | 184/5 |
| 6,711,963 | B2 * | 3/2004 | Yabe | 74/89.44 |
| 6,732,600 | B2 * | 5/2004 | Greubel | 74/89.44 |
| 2006/0051005 | A1 * | 3/2006 | Schott | 384/462 |

* cited by examiner

*Primary Examiner*—Richard W L Ridley
*Assistant Examiner*—Terence Boes
(74) *Attorney, Agent, or Firm*—Chun-Ming Shih

(57) ABSTRACT

The rotating nut ball screw unit with lubricating arrangement has a lubricating device composed of a main body, a collar and a bearing. The main body is provided with several oil holes and is attached to the end surface of the nut. The main body is relatively rotatable with respect to the collar intercalating the bearing therebetween. An oil storage forces the lubricant into an oil reserving space surrounded by the main body, the collar and the bearing. The oil reserving space is in communication with the oil holes and allows the lubricant to be forced into the main body and then to reach the surface of the screw bolt via oil holes. The forced lubrication arrangement of the present invention ensures a better lubricating effect.

4 Claims, 6 Drawing Sheets

ROTATING NUT BALL SCREW UNIT WITH LUBRICATING ARRANGEMENT

BACKGROUND OF THE INVENTION

1. Field of the Invention

The present invention relates to a rotating nut ball screw unit, and more particularly, to a rotating nut ball screw unit having a lubricating device.

2. Description of the Prior Art

In a rotating nut ball screw unit, the nut and the bearing shell is formed in one piece. The bearing shell is engaged with a working table, and the mechanical power is transmitted to the nut from a motor with a belt conveyer so as to drive the nut to rotate against the stationary screw bolt thereby removing the working table in the axial direction. As the screw bolt does not move, it is free from the problematic rotational inertia that causes a slender ball screw unit able to work with a high speed easily using a relatively small motor. With this merit, it is specially preferable to the semiconductor industry, the wood working machine, and the conveyance work that are considered to be modern and very important industries nowadays.

U.S. Pat. No. 5,809,838 and No. 6,732,600 disclosed a rotating nut ball screw unit with lubricating arrangement, which has a lubricating device as shown in FIG. 1. Referring to FIG. 1, a via hole 941 is bored through a bearing shell 940 to communicate an externally lubricating device with the inner space of the bearing 94. A nut 92 is also provided with a via hole 921 facing to the via hole 941 so as to transport the lubricating oil from the outside lubricating device to the inner wall of the nut 94 thereby lubricating a screw bolt 91 and balls 93. Meanwhile, the Lubricating means arranged as such has the following demerits, namely:

1. Some modifications have to be done on the nut 92 and the bearing shell 940 which might reduce the rigidity of the entire structure.

2. The ideal lubrication effect is seldom attained as continuous supply of the lubricant to the outer thread 910 of the screw bolt 91 and the inner thread 920 of the nut 92 is apt to meet interruption until the lubricant is full in all the space inside the nut 92.

Another contrivance disclosed in U.S. Pat. No. 6,364,058 provides a lubricant box at an end surface of the nut to lubricate the nut with a lubricating means. However, this structure is inapplicable to the rotating nut ball screw unit since the lubricant box attached to the nut will rotate along with the nut and force the lubricant to stick on the inner surface of an oil supply pipe unless some remedy is taken to overcome the centrifugal force.

SUMMARY OF THE INVENTION

In order to palliate the shortcomings inherent to the conventional techniques described above, the inventor of the present invention has delved into this matter in full swing for a long time efforts and came to realization of the present invention.

Accordingly, it is the main object of the present invention to provide a rotating nut ball screw unit with a lubricating device provided at one side to effectively lubricate the ball screw unit by forced oil supply.

To achieve the above object, the present invention is constructed with the following component parts:

a screw bolt with an outer threaded surface; and a rotating nut unit comprising a nut, several split bearings and a bearing shell. The nut is hollow and is encircling the screw bolt, the inner surface of the nut is provided with an inner spiral groove corresponding to the outer threaded surface of the screw bolt. The bearings are disposed to surround the nut and enclosed by the bearing shell. The nut is rotated against the bearing shell with the split bearings intercalated therebetween.

A plurality of balls are interposed between the outer threaded surface of the screw bolt and the inner spiral groove of the nut.

Oil storage is provided for supplying lubricating oil.

A lubricating device comprises a main body, a collar and a bearing. The main body, which has several oil holes, is fixed to an end surface of the nut. The collar necks around the main body with the bearing intercalated therebetween so as to let the main body able to rotate with respect to the collar thereby conducting the lubricant from the oil storage into an oil reserving space encircled by the main body, the collar and the bearing. The oil reserving space is communicated with the oil holes so that the lubricating oil can reach the surface of the screw bolt via oil holes.

BRIEF DESCRIPTION OF THE DRAWINGS

The present invention may best be understood through the following description with reference to the accompanying drawings in which.

DETAILED DESCRIPTION OF THE PREFERRED EMBODIMENT

Figure 1:
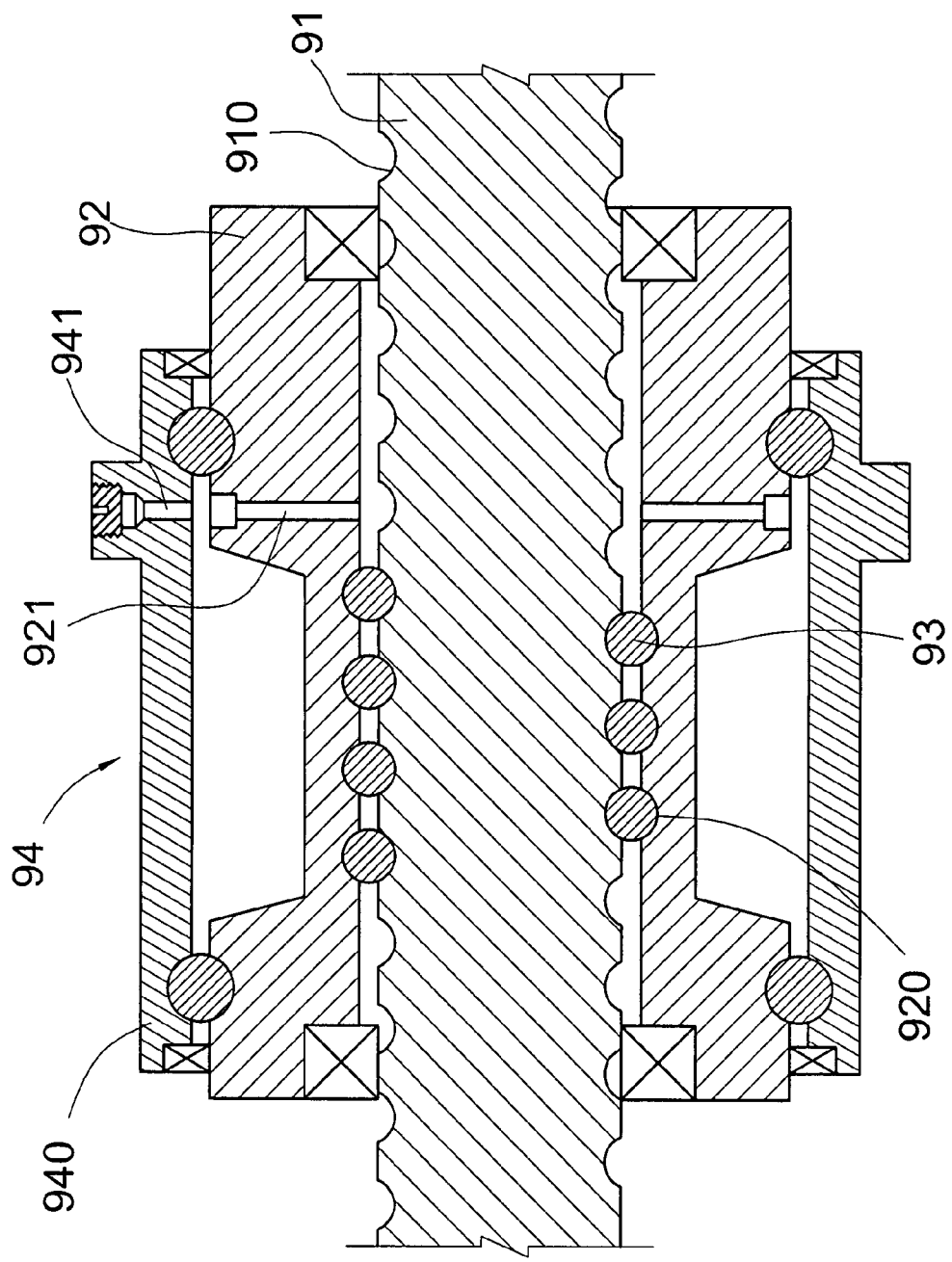
FIG. 1 is cross sectional view of a conventional rotating nut ball screw unit with a lubricating device.
Figure 2:
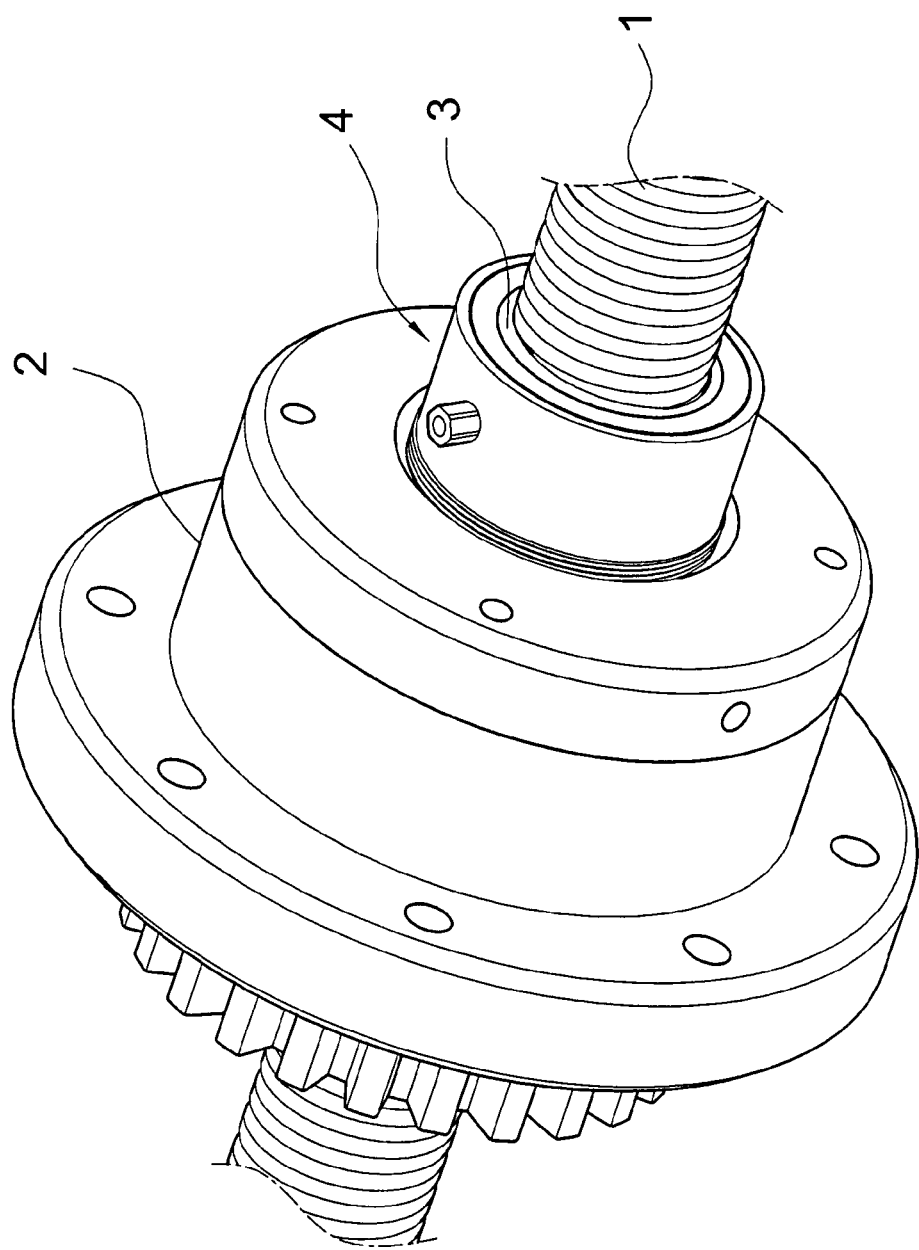
FIG. 2 is a perspective view of the rotating nut ball screw unit with lubricating arrangement according to the present invention.
Figure 3:
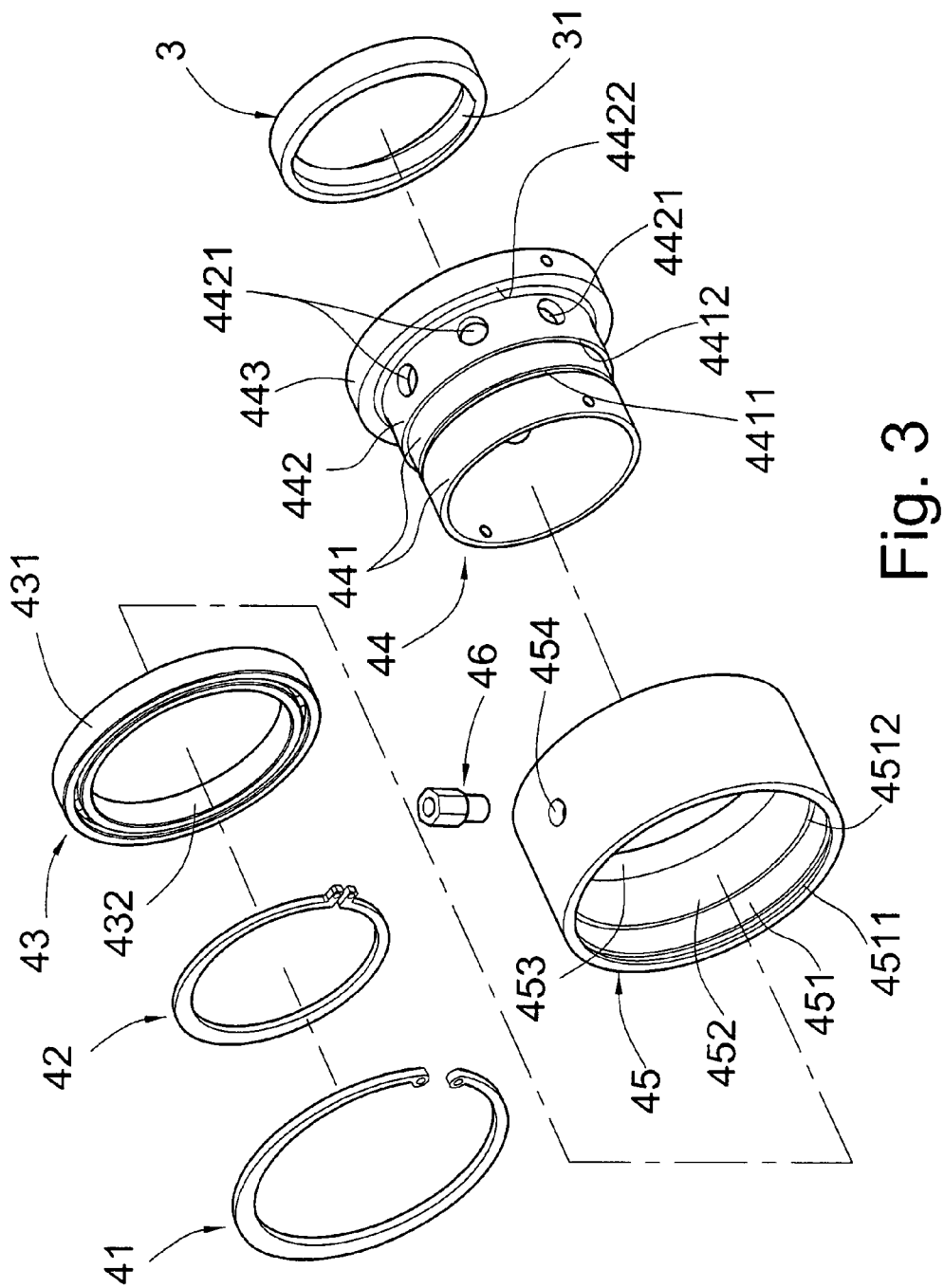
FIG. 3 is an exploded view of the lubrication device of the present invention.
Figure 4:
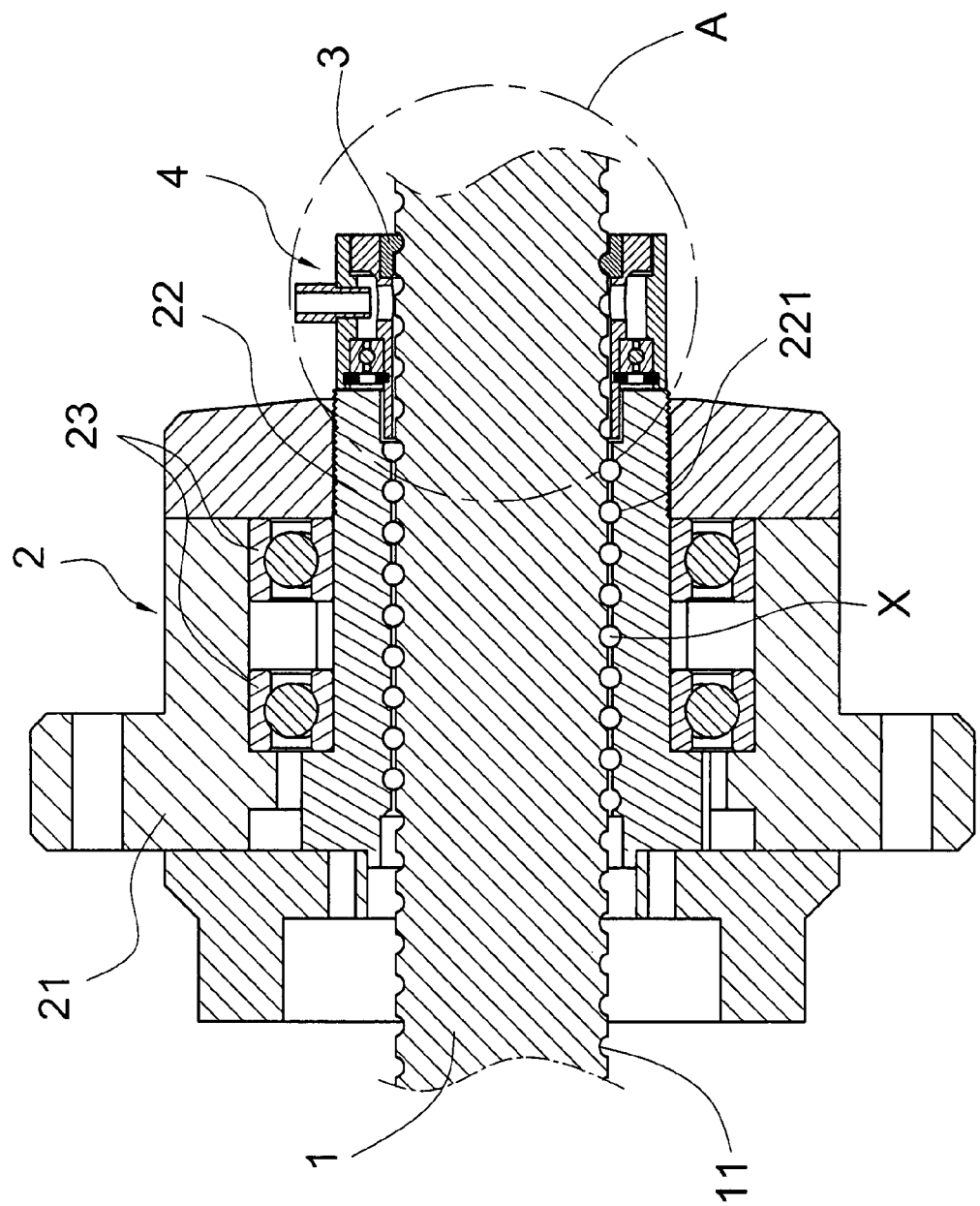
FIG. 4 is a cross sectional view of the present invention.

Referring to FIG. 2 through FIG. 6, the rotating nut ball screw unit with lubricating arrangement of the present invention is composed of the following component parts:

a screw bolt 1 with an outer threaded surface 11, and a rotating nut unit 2 comprising a nut 22, several split bearings 23 and a bearing shell 21. The nut 22 is hollow and encircling the screw bolt 1, the inner surface of the nut 22 is provided with an inner spiral groove 221 corresponding to the outer threaded surface 11 of the screw bolt 1. The bearings 23 are disposed to support the nut 22 and enclosed by a bearing shell 21 such that the nut 2 can rotated against the bearing shell 21 with the split bearings 23 intercalated therebetween.

A plurality of balls X are interposed between the outer threaded surface 11 of the screw bolt 1 and the inner spiral groove 221 of the nut 22.

An oil storage (not shown) communicated with an oil outlet 46 is provided for supplying the lubricant.

A lubricating device 4 (see FIG. 3) comprises a main body 44 with several oil holes 4421, a collar 45, and a bearing 43. The main body 44 is fitted to an end surface of the nut 22. The main body 44 is necked around by the collar 45 to rotate with respect to the latter by intercalating the bearing 43 therebetween so as to supply the lubricant into an oil reserving space 90 formed among the main body 44, the collar 45 and the bearing 43 from an oil storage. The oil reserving space 90 is communicated with the oil holes 4421 to allow the lubricant to reach the surfaces of the screw bolt 1, the rotating nut 2 and the balls X.

The lubricating device 4 is further composed of a first hoop 41, a second hoop 42 a bearing 43 except the aforesaid main body 44, collar 45 and oil outlet 46.

The main body 44, which is attached to an end surface of the nut 22, further includes a first, a second and a third stepped surfaces 441, 442, 443, an accommodation compartment 444 (see FIG. 5), a first groove 4411, a first and a third detent surfaces 4412, 4422.

Figure 5:
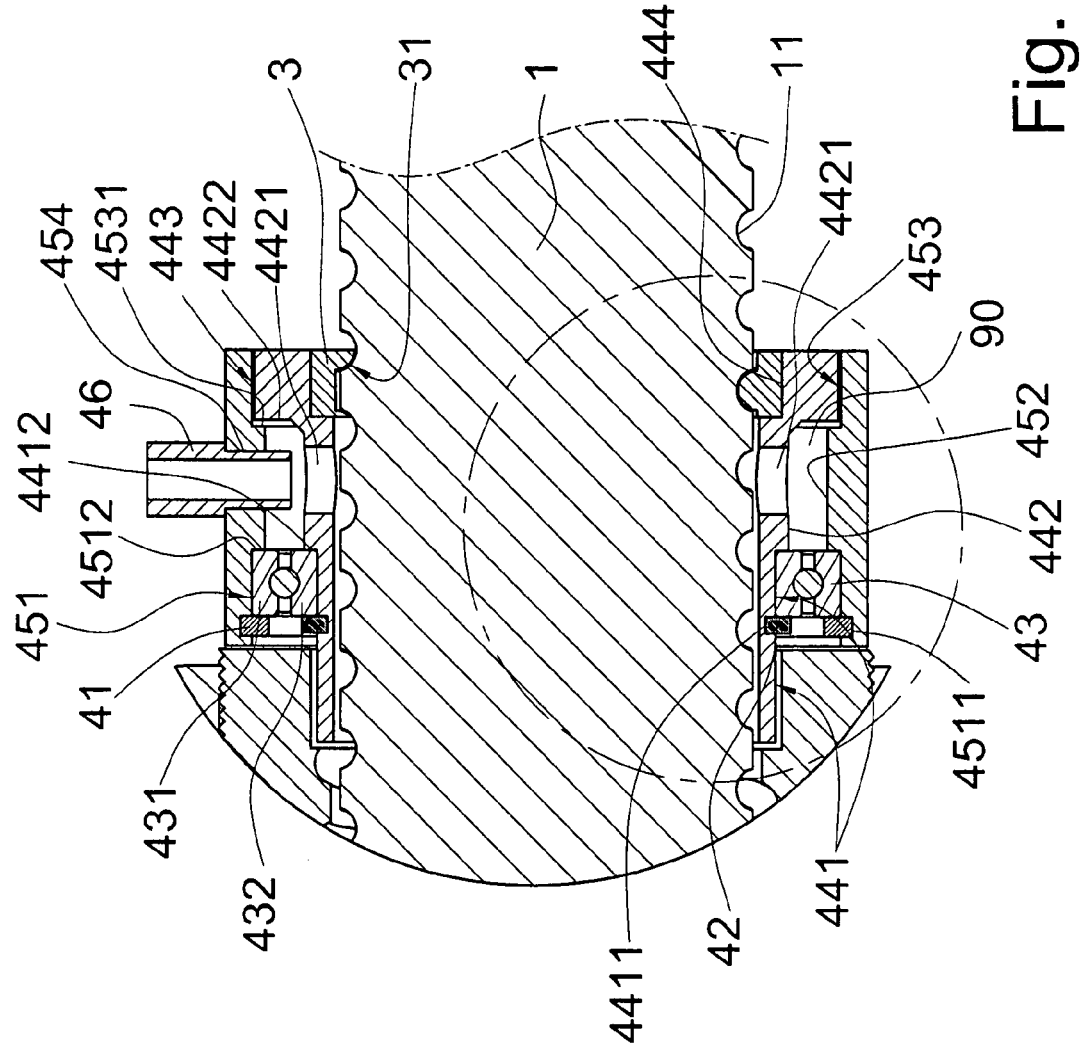
FIG. 5 is a partially enlarged view of FIG. 4.
Figure 6:
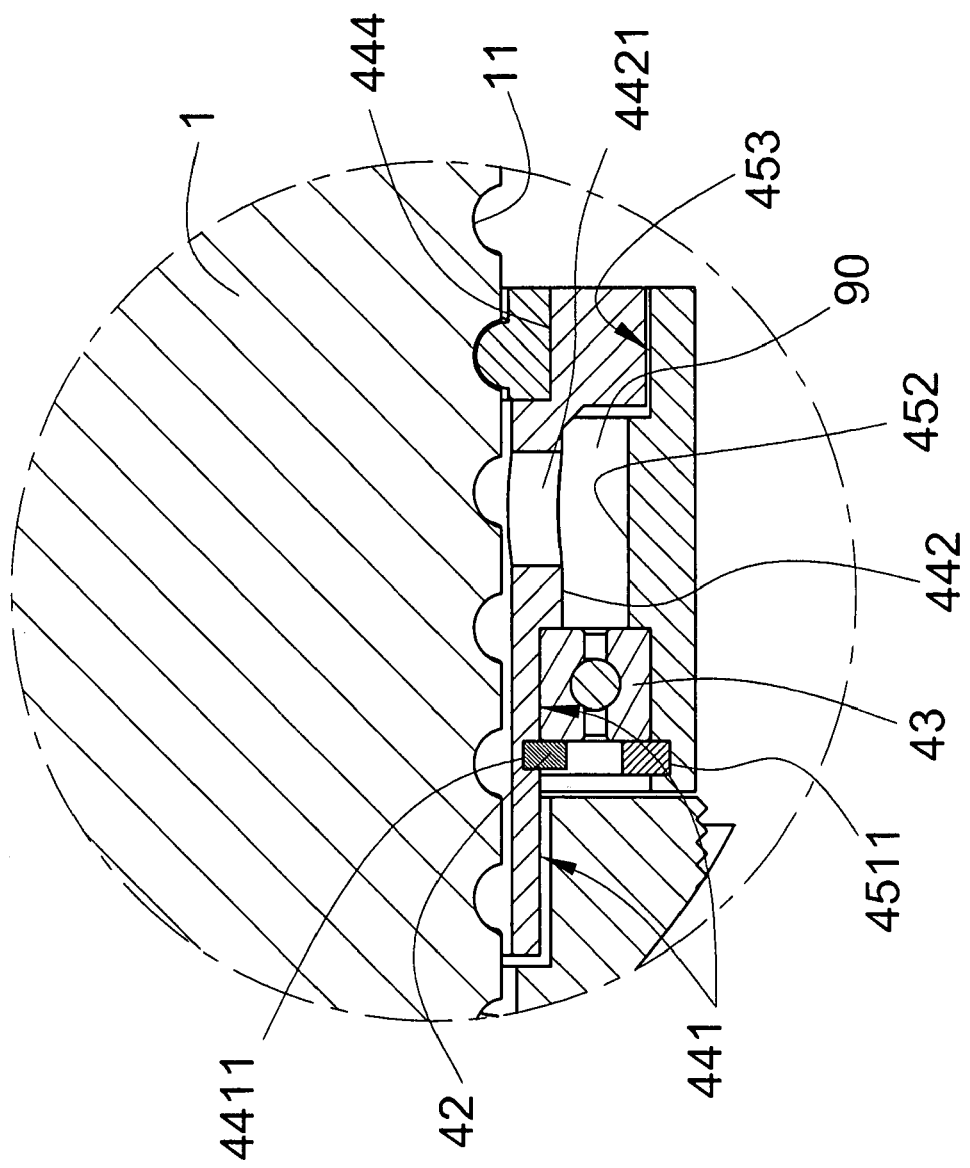
FIG. 6 is a partially enlarged view of FIG. 5.

Referring to FIG. 5, the collar 45 consists of a first, a second, and a third inner annular surfaces 451, 452, 453, a second groove 4511, a second and a fourth detent surfaces 4512, 4531, and a detent hole 454.

An inner wall 432 and an outer wall 431 of the bearing 43 is respectively fitted to the first stepped surface 441 of the main body 44 and the first inner annular surface 451 of the collar 45 such that the two end surfaces of the bearing 43 are respectively detained by the first detent surface 4412 of the main body 44 and the second detent surface 4512 of the collar 45 when the main body 44 and the collar 45 make a relative rotation with each other intercalating the bearing 43 therebetween. Further to this, the first hoop 41 and the second hoop 42 are respectively necked into the second groove 4511 of the collar 45 and the first groove 4411 of the main body 44 so as to reliably restrict the free axial excursion of the bearing 43.

With this structure, the oil reserving space 90 which is surrounded by the second stepped surface 442, third stepped surface 443 and third detent surface 448 of the main body 44, the second inner annular surface 452, fourth detent surface 4531 and the third inner annular surface 453 of the collar 45 and the bearing 43 is able to get oil supply from the oil reservoir via the oil holes 4421 bored on the main body 44.

The detent hole 454 provided on the collar 45 that fixes the oil outlet 46 at its position is also communicated with the oil reserving space 90, and the oil outlet 46 is externally connected to the lubricating device with a pipe such that allowing the lubricant be forced into the oil reserving space 90.

Besides, the accommodation compartment 444 which is provided at outer end surface of the main body 44 is further provided with a scraper 31 having a scraping member facing to the outer threaded surface 11 of the screw blot 1 so as to wipe out the foreign materials such as dust and culls thereby preventing them to intrude inside the nut 22.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A rotating nut ball screw unit with lubrication arrangement comprising:
   a screw bolt with an outer threaded surface;
   a rotating nut unit comprising a nut, several split bearings and a bearing shell, wherein said nut is hollow and encircling said screw bolt, the inner surface of said nut is provided with an inner spiral groove corresponding to the outer threaded surface of said screw bolt, said bearings are disposed to support said nut and enclosed by said bearing shell, said nut is rotated against said bearing shell with said split bearings intercalated therebetween;
   a plurality of balls interposed between the outer threaded surface of said screw bolt and the inner spiral groove of said nut;
   an oil storage in connection with an oil outlet for supplying lubricating oil; and
   a lubrication device comprising a main body, a collar and a bearing; wherein said main body has several oil holes and is fixed to an end surface of said nut, said collar necks around said main body with said bearing intercalated therebetween so as to allow said main body able to rotate relatively with respect to said collar thereby conducting the lubricant from said oil storage into an oil reserving space formed among said main body, said collar and said bearing, said oil reserving space is communicated with said oil holes so that the lubricating oil can reach the surface of said screw bolt via said oil holes.

2. The rotating nut ball screw unit of claim 1, wherein said main body is provided with an accommodation compartment with a scraper at its outer end surface.

3. The rotating nut ball screw unit of claim 1, wherein said oil reserving space is surrounded by second and third stepped surfaces and a third detent surface of said main body, second and third inner annular surfaces and a fourth detent surface of said collar, and said bearing.

4. The rotating nut ball screw unit of claim 1, wherein said collar further has a detent hole in communication with said oil reserving space, and an oil outlet connected externally to said oil storage with an oil pipe attached to said detent hole.

* * * * *